Sept. 2, 1958      F. O. ROBBINS ET AL      2,849,813
RESERVATION AVAILABILITY SIGNBOARD OF INDICATOR
Filed Aug. 14, 1953      2 Sheets-Sheet 1
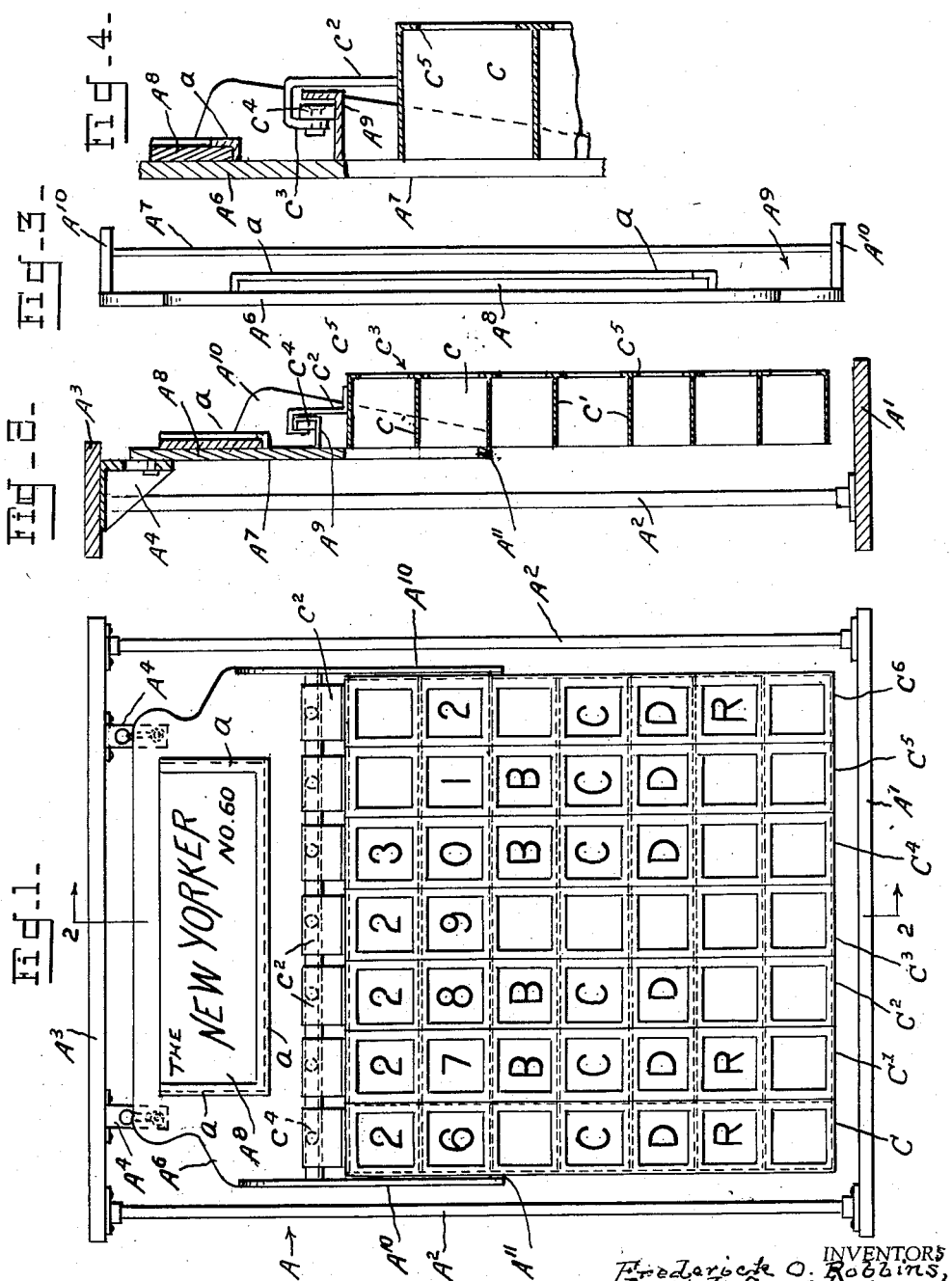
INVENTORS
Frederick O. Robbins,
Joseph Sweeder,
Willis Dunbar,
Raymond W. Wozke,
By C. C. Hines,
ATTORNEY

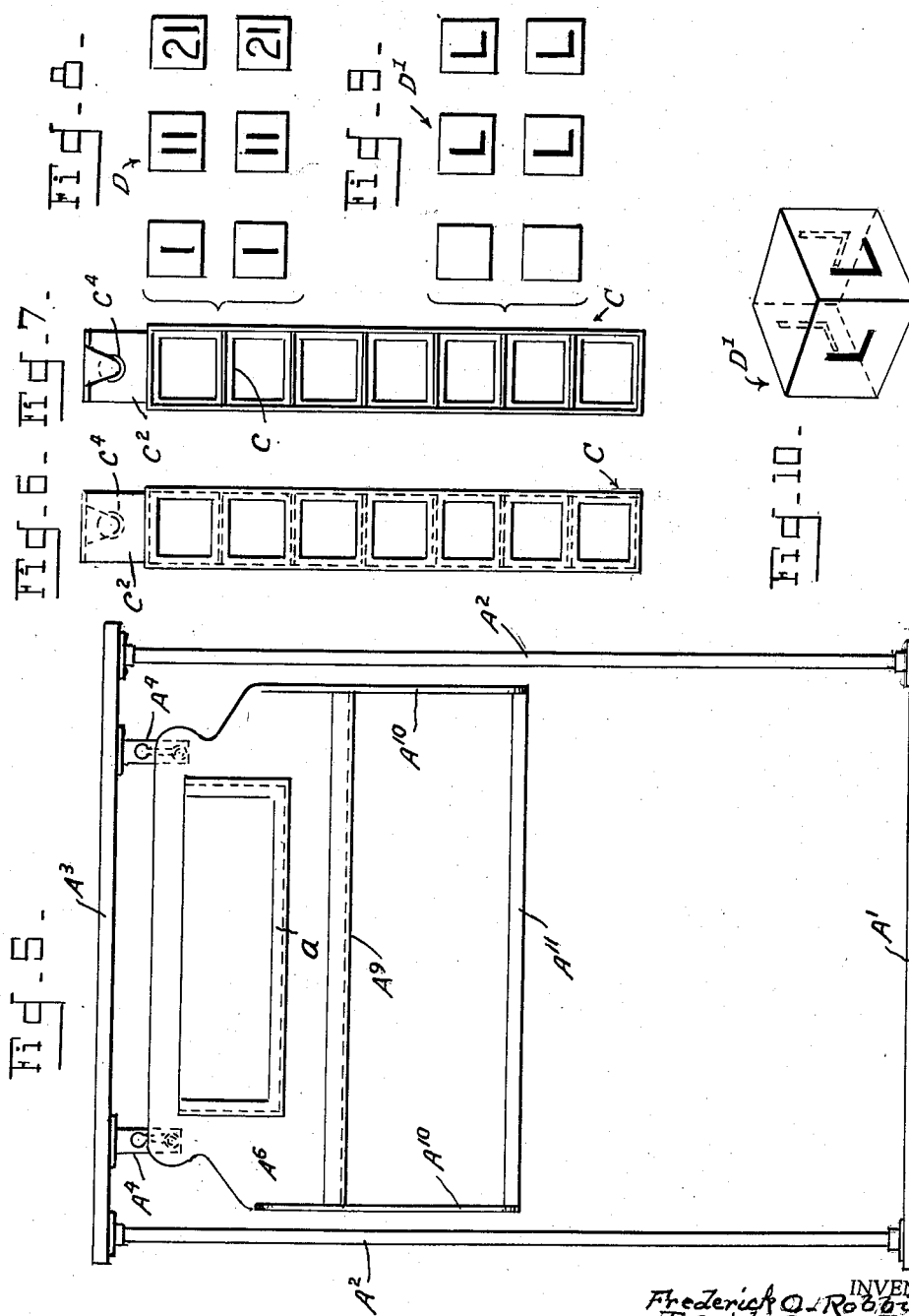

United States Patent Office
2,849,813
Patented Sept. 2, 1958

2,849,813
RESERVATION AVAILABILITY SIGNBOARD OR INDICATOR

Frederick O. Robbins and Joseph Sweeder, Euclid, Willis Dunbar, Lakewood, and Raymond W. Wolke, Westlake, Ohio; said Robbins and said Sweeder assignors of twenty-five percent to The Pennsylvania Railroad Company, a corporation of Pennsylvania, and twenty-five percent to The New York Central Railroad, a corporation of New York Application August 14, 1953, Serial No. 374,254
13 Claims. (Cl. 40—63)

This invention relates to a space reservation sign board or indicating board for use in railroad ticket offices or the like for the purpose of giving visual information as to what space reservations or reserved accommodations on a carrier vehicle or the cars of a train have not, on a certain date or dates, been sold and are available for sale to prospective passengers or patrons of the railroad.

The primary object of the invention is to provide a sign board or indicating board, which we term "availability board" which upon inspection will furnish immediate information as to the available space for sale with regard to the quality and/or quantity of the space, or if no space for sale exists, which information will be displayed so as to be visible in a ticket office, first to sales clerks at a ticket counter, second to sales clerks at the telephones, and, third, to the prospective purchasers applying for such reservations at the ticket counter, in such manner as to facilitate the work of determining what reserved accommodations are available for sale and the issuance of reservation tickets therefor.

A further object of the invention is to provide a signboard of this character which will avoid the necessity of sales representatives searching through records, such as space diagram blocks, or using other time consuming means, to secure the desired information, and to provide a board embodying means of interchangeable type and shiftable from position to position on the board, to furnish the information desired for a current day and following days within a determined number of days.

The invention may be used for the purpose set forth or for an analogous purpose in conducting sales transactions in any similar sales system, but will be described in connection with the sale of space reservations in a vehicle, such as a Pullman car or cars of a train having various reserved spaces to be sold to passengers for use between travel points, such as seats, upper and lower berths, roomettes, bedrooms, compartments, drawing rooms, etc., the right of use of which the passenger pays for at prescribed rates in addition to the payment of a transporation charge. The usual procedure is for the patron to buy a transportation ticket at a ticket office or station and request a desired reservation for which he pays, if it is available, and received in turn a reservation ticket which he presents to the train conductor, or the patron may order the ticket by mail or telephone to be picked up by him within a given time period. In either case the ticket seller must consult, usually by telephone, a ticket reservation bureau or division, where the reservation records are kept on diagram charts in order to ascertain whether the desired reservation is available, which often takes some time, as the clerk at the reservation division may have to consult a considerable number of charts before he can advise the ticket seller that the reservation is available, if it is, and can be granted. Cancellations of reservations also involve these time delay transactions, and mistakes in talks over the telephone may result in misunderstandings, so that duplicate sales, with resulting trouble and inconveniences to both the railroad and the patron, may occur.

The present invention is designed to overcome these objections and provide a ready record of the reservation transactions which may be made and indicated as and when they occur to enable a ticket seller to immediately determine what reserved spaces are available.

In the accompanying drawings, forming a part of this specification:

Fig. 1 is a view in front elevation of an availability board embodying our invention as designed for use to indicate available reservations on a car or the cars of a train for a seven-day period;

Fig. 2 is a vertical section through the board and one of the sign panels taken on line 2—2 of Fig. 1;

Fig. 3 is a top plan view of the board per se from which the panels have been removed;

Fig. 4 is an enlarged detail vertical section through the upper part of the board;

Fig. 5 is a front elevation of the supporting frame and board from which the sign panels have been removed;

Figs. 6 and 7 are reverse face views of one of the sign panels from which the sign blocks have been removed;

Figs. 8 and 9 are group views showing the sides of two of the removable and interchangeable sign blocks used in connection with the panels; and Fig. 10 is a perspective view of one of the blocks.

Referring now more particularly to the drawings, A designates the supporting frame of the signboard, which comprises a base $A'$ having posts or uprights $A^2$ rising therefrom and carrying a hanger $A^3$ provided with brackets $A^4$ fixedly or detachably suspending a signboard $A^5$ therefrom. This signboard has an upper head portion $A^6$ and a lower panel supporting portion $A^7$. The head portion $A^6$ is provided with grooved guideways or holders $a$ to slidably receive a sign plate $A^8$ bearing the name of a train, its given number and its time of departure from a station. This plate is removable so that a similar plate for any train may be placed in the holders.

The lower or panel supporting portion $A^7$ of the board is formed of a channeled track $A^9$ arranged at the base of the head portion $A^6$, a pair of L-shaped side rails or bars $A^{10}$ depending therefrom, and a transverse abutment plate, bar or rod $A^{11}$ connecting the side bars at their lower ends. The track $A^9$ and bar or plate $A^{11}$ are preferably disposed in rear of the plane of the front face of the head portion $A^6$, while the outer portions or flanges of the side rails or bars $A^{10}$ project forwardly therefrom to provide a space or recess therebetween for the receptions of the upper portions of a series of sign panels C—$C^6$ which are disposed in a row side by side between said bars or rails $A^{10}$.

Seven sign panels C—$C^6$ are shown in the present instance which are used to cover a period of a like number of days, each panel being formed to hold a vertical series of sign elements bearing indicia representing the number and character of the reservation spaces on the indicated train which have not been sold and are available at the time on a particular day. For instance, from left to right the panels C—$C^6$ may represent the days of a week beginning with Monday and ending with the following Sunday or they may represent days of a month from 1 to 7 or any other consecutive days of a month.

Each panel comprises a hollow channeled body divided by partitions $c$ to form cells or compartments $c'$ to receive sign elements of the character described, which are preferably in the form of removable and interchangeable rectangular number and letter carrying blocks D, $D^1$ of a size to fit within the cells or compartments $c$. Each panel is shown as being provided with seven such cells or compartments to receive a corresponding number of blocks, but the number may be varied as required and to suit service conditions. Each panel is provided at its top with a suspending portion $c^2$ carrying a hanger bracket $c^3$ and a roller $c^4$ to engage and travel along the track $A^9$ whereby the panel is suspended from the track and arranged to rest against the backs of the side rails A' and the abutment bar or plate $A^{11}$. By this means the panel may be detached at any time for removal or shifted from one position to another position by simply lifting it to disengage the roller from the tracks. Thus at the end of each day the panel at the left, or current day's panel from which that day's tickets have been sold, may be removed and the remaining panels moved along the trackway to bring the next panel into selling position for the next day's sales. When the current day panel at the left is removed at the close of its determined time period of use it may be transferred for the time being to the right of the row and its sign matter changed to show the reservations available on a train departing on a day succeeding the day represented by the preceding panel, so that the calendar order of the panels may be preserved.

As shown, each panel cell $c$ is of rectangular form to snugly receive a block and is open at rear and front to respectively admit of the insertion and removal of a block and to expose the sign matter disposed on two opposite faces of the block fitted therein. The opening at the front of each cell may be marginally bounded by a stop head $c^5$ against which the forward face of the block abuts when the block is properly inserted into position, but any other means for ensuring registry of the block with the front of the panel, or retaining the block in position, may be employed.

This availability board is especially designed to be used in a reservation sales system in which preprinted reservation sales tickets are used, one for each reserved space in a car or cars of a train departing at a certain time on a certain day or date, different colored tickets printed to give the name and/or the number of the train, the date and a code symbol, indicating the reservation space, being printed on each ticket, and the tickets for issue on a number of successive days, for example, a period of one week or other determined time period, being stacked in a container or containers from which they are dispensed, the containers being shifted from day to day to dispose a current day's stack of tickets in a sales position. The code characters used to indicate the kinds of reservation spaces for sale on a certain car or cars, for example, seven in number, as follows:

L—for lower berth,
U—for upper berth,
R—for roomette,
B—for bedroom,
C—for compartment,
D—for drawing room, and
X—for duplex rooms.

As the reservation sales are directly made and the tickets issued, or set aside in a "pick-up" group, it is desirable to provide a means for ready inspection to enable ticket sellers to see at a gance, and without searching records, what reservations have not been sold or set aside and are available for sale at the time a patron applies for one on a train departing on any one of a number of days, which is the purpose of the availability board, the panels of which represent train days and the blocks changeable indicators placed or varied in position in the panels as sales are made to show what reserved spaces are still available for sale. As shown, the blocks D, $D^1$, each of which is in the form of a six-sided cube, are provided with blank or uncoded faces and with coded faces to indicate a date and available reserved spaces of the character above described.

The following description applies to the sales system, ticket containers, the construction of the sign blocks, and their mode of use which will give an understanding of the arrangement of the instrumentalities referred to, and how they are employed:

The function of the availability board, as stated, is to furnish immediate information as to the available space for sale, the quality and/or quantity of the space and if no space exists. This information is visible—

First, to the sales representatives at the ticket counter,
Second, to the sales representatives at the order telephones, and
Third, to the passengers at the front of ticket counter.

The use of this board eliminates the necessity of any of the sales representatives searching through any records to obtain the above information. It will be unnecessary for any of these groups to ask the question in any manner, either verbally or by motions such as dialing, pushing buttons or placing matrices in a device.

The availability board will be located immediately above the ticket containers for the period it indicates. As an example: if the containers hold reservation tickets for one week, starting with the current day and the next six days, the availability board would indicate space for the current day and the next six days.

The availability board is divided into sections covering seven days of operation for each train or for each destination of a train. The sections can be placed one along side the other and as many as there is physical room or as necessity dictates. Each section is divided into seven removable panels, each panel representing a day. Extending across the top of the entire seven panels is an indicator stating the destination of the train, number and train name, departing time and the name of the railroad. The top of the panel will have an extending bracket to which is affixed a fibre roller and this roller rests in a metal track underneath the designation above and functions as both a hanger for the panel and a track to move the panels from one position to another position. This change of positions is necessary to keep the dates in proper order. In each section the first date on the left, represented by the first panel of the seven involved, would be the current day, the second panel from the left would be tomorrow's date, the third panel would be that date and the day after tomorrow and so on from left to right for the current date and the next succeeding dates. When the current day is passed the panel can be lifted down from its hanger and track and the six remaining panels can be rolled on the track from the right to the left leaving an open space on the right where the panel, just removed, can be placed and the seven panels would then again be in position as before with the current day on the left and the next six succeeding days following in order.

Each of the panels has holders for seven removable indicators. Each block is of a dark finish to match the background of the panel and on two of its opposite faces would appear a letter, attached to the face of the block with an adhesive and material known as "Scotch light." This material has a reflecting quality that reflects any light which shines upon it and gives a sparkling effect. The numbers and letters on this block can be seen from a distance of 30 feet or more. The same code letter or numbers would appear on each of pair opposite sides of the block.

The purpose of the code letters or numbers would be to indicate—First, a date; as an example if figure "1" is on two opposite sides of the block D and this block is placed in the panel, the figure "1" would indicate the first day of the month and would appear on both the front and back side of the panel. On two other opposite faces of the block would appear the figure 11 and on another two opposite faces of the block would appear the figure 21. The second block would have the figure 2 on opposite faces, figure 12 on two faces and figure 22 on two faces, the third block would have 3, 13 and 23, the fourth block would have 4, 14 and 24, the fifth 5, 15 and 25, the sixth 6, 16 and 26, the seventh 7, 17 and 27, the eighth 8, 18 and 28, the ninth 9, 19, and 29, the tenth 10, 20 and 30, and the last block would have the figure 31 on two opposite faces. This requires a total of eleven blocks to indicate dates for one section of the availability board, and the color of these dates would be red.

The blocks D' for the indication of sleeping car space would be the same size as the blocks described above for indication of dates. However, on two opposite sides of the block there would be no letters shown and when placed within the panel with this blank space showing it would indicate that none of that particular type of space is available. On two opposite sides of the block would appear a code letter to indicate that an unlimited amount of space is available and this letter would be of the "Scotch light" material in white. On two opposite sides of the block this letter would be "Scotch light" material of yellow color to indicate that a limited amount of space was available or that only undesirable and end space was available. The letters referred to are those (L, U, R, B, C, D, B) used for the indication of reservation spaces of the character above described, which when displayed will indicate what spaces have not been sold and are still available for sale.

From the foregoing description the construction, mode of use and advantages of our availability board will be readily understood and appreciated by those versed in the art without a further and extended description. While the construction shown is one well adapted for the purpose, it is to be understood that it is merely exemplificative of means for the purpose which may be used, and that any equivalent means, coming within the scope of the appended claims may be employed without departing from the spirit of the invention.

Having thus described our invention, we claim:

1. A railway available space reservation indicator for indicating reserved space accommodations of a car or cars of a train available for sale at any time on given days throughout a period of days, said indicator including in combination an open rectangular main supporting frame embodying a base, a top head portion and spaced uprights connecting the same, a supplemental sign carrying frame detachably connected with and suspended from the head portion of the main frame and having a sign portion for display of subject matter in relation to the train about which such information is to be given and having a trackway arranged below and extending transversely of said supplemental frame, and an abutment surface extending transversely of said supplemental frame below and in spaced relation to the trackway, a row of individual sign carrying panels representing day periods arranged side by side beneath said trackway and resting against the abutment surface, said panels being slidably and detachably suspended from and mounted for travel along the trackway, and provided with vertically arranged side pieces and horizontally arranged vertically spaced partitions forming a plurality of holding cells of rectangular outline form and open at front and rear, and sign bearing interchangeable rectangular blocks detachably engaged with the holders and bearing distinguishing indicia giving desired information in relation to the availability of space reservations on the trains designated on said sign portion.

2. In a changeable sign apparatus for indicating train reservations available for sale from day to day over a given period of a number of days, the combination of a supporting frame having sign bearing means designating the train and having a horizontal transverse track rail, a series of vertical sign display panels arranged side by side transversely of the frame and representing successive days of the given period, each panel comprising a pair of vertically disposed side pieces and horizontally arranged partitions spaced apart vertically and providing a series of superposed holders for the reception and display and removal of interchangeable sign elements bearing indicia representing when displayed reservations available on the day represented by the panel at the time the panel is viewed, said holders being open at their front and rear faces, and said sign elements bearing similar indicia on their front and rear faces, and a hanger at the upper end of each panel detachably suspending the panel from the trackway and mounting the panel for travel on the trackway, whereby at the close of business of a day represented by the foremost panel of the series said panel may be detached from the trackway and the remaining panels moved forward along the trackway to bring the panel next in order into foremost position for next day's sales indications.

3. In a changeable sign apparatus for indicating train reservations available for sale from day to day over a given period of a number of days, the combination of a supporting frame having sign bearing means designating the train and having a horizontal transverse track rail provided with a vertical retaining flange and a horizontal transverse abutment surface arranged below and in spaced relation to the track rail, a series of vertical sign display panels arranged side by side transversely of the frame and representing successive days of the given period, each panel comprising a pair of vertically disposed side pieces and horizontally arranged partitions spaced apart vertically and providing a series of superposed holders for the reception and display and removal of interchangeable sign elements bearing indicia representing when displayed reservations available on the day represented by the panel at the time the panel is viewed, said holders being open at their front and rear faces, and said sign elements bearing similar indicia on their front and rear faces, and a roller carrying hanger at the upper end of each panel overlying the flange of the trackway and detachably suspending the panel from the trackway and mounting the panel for travel on the trackway, whereby at the close of business of a day represented by the foremost panel of the series said panel may be detached from the trackway and the remaining panels moved forward along the trackway to bring the panel next in order into foremost position for next day's sales indications.

4. In a changeable sign apparatus for indicating train reservations available for sale from day to day over a given period of a number of days, the combination of a supporting frame having sign bearing means designating the train and having a horizontal transverse track rail provided with a vertical retaining flange and a horizontal transverse abutment surface arranged below and in spaced relation to the track rail, a series of vertical sign display panels arranged side by side transversely of the frame and representing successive days of the given period, each panel comprising a pair of vertically disposed side pieces and horizontally arranged partitions spaced apart vertically and providing a series of superposed holding cells of rectangular outline form and each having a display window at the front thereof and an entrance opening at the rear thereof for the introduction and removal of interchangeable sign elements bearing indicia representing when displayed reservations available on the day represented by the panel at the time the panel is viewed, said holders being open at their front and rear faces, and said sign elements bearing similar indicia on their front and rear faces, and a roller carrying hanger at the upper end of each panel overlying the flange of the trackway and suspending the panel from the trackway and mounting the panel for travel on the trackway, whereby at the close of business of a day represented by the foremost panel of the series said panel may be detached from the trackway and the remaining panels moved forward along the trackway to bring the panel next in order into foremost position for next day's sales indications.

5. In a changeable sign apparatus for indicating train reservations available for sale from day to day over a given period of a number of days, the combination of a supporting frame having sign bearing means designating the train and having a horizontal transverse track rail and a horizontal transverse abutment surface arranged below and in spaced relation to the track rail, a series of vertical sign display panels arranged side by side transversely of the frame and representing successive days of the given period, each panel comprising a series of superposed holding cells of rectangular outline form and each having a display window at the front thereof and an entrance opening at the rear thereof for the introduction and removal of interchangeable sign element bearing indicia representing when displayed reservations available on the day represented by the panel at the time the panel is viewed, said holders being open at their front and rear faces, and said sign elements bearing similar indicia on their front and rear faces, and a hanger at the upper end of each panel detachably suspending the panel from the trackway and mounting the panel for travel on the trackway, whereby at the close of business of a day represented by the foremost panel of the series said panel may be detached from the trackway and the remaining panels moved forward along the trackway to bring the panel next in order into foremost position for next day's sales indications.

6. A changeable sign apparatus of the character set forth in claim 5 wherein each sign element comprises a rectangular block of a form to fit the cell of a display panel and having its angular faces provided with reservation indicia, any one of which may be exposed by selective positioning of the block in the cell and the opposite faces of which are provided with similar indicia.

7. In a changeable sign apparatus for indicating train reservations available for sale from day to day over a given period of a number of days, the combination of a supporting frame having sign bearing means designating the train and having a horizontal transverse track rail, a series of vertical sign display panels arranged side by side transversely of the frame and representing successive days of the given period, each panel comprising a pair of vertically disposed side pieces and horizontally arranged partitions spaced apart vertically and providing a series of superposed holding cells of rectangular outline form and each having a display window at the front thereof and an entrance opening at the rear thereof for the introduction and removal of interchangeable sign elements bearing indicia representing when displayed reservations available on the day represented by the panel at the time the panel is viewed, said holders being open at their front and rear faces, and said sign elements bearing similar indicia on their front and rear faces, and a hanger at the upper end of each panel detachably suspending the panel from the trackway and mounting the panel for travel on the trackway, whereby at the close of business of a day represented by the foremost panel of the series said panel may be detached from the trackway and the remaining panels moved forward along the trackway to bring the panel next in order into foremost position for next day's sales indications.

8. An indicator of the character described comprising a supporting frame provided with a horizontal transverse trackway and an abutment surface arranged below and spaced from the trackway, a row of sign display panels arranged side by side and resting against the abutment surface and provided at its upper end with a hanger for detachable suspension from pivotal engagement with and travel along the trackway, each panel being provided with vertically arranged side pieces and horizontally arranged spaced partitions forming a vertical row of cells, each open at front and rear, and a sign display block adapted to be removably mounted in each cell and having angularly related sign display faces any one of which may be exposed by selective positioning of the block in the cell.

9. In an indicator of the character described, a sign display panel comprising an elongated relatively narrow body formed by a pair of vertically arranged side pieces and horizontally arranged vertically spaced partitions forming a vertical series of fixedly connected cells of generally rectangular outline shape, each closed at its sides, open at its rear for the introduction and removal of a sign element adapted to fit therein and having at its front a window for the display of indicia on the sign element, and a roller carrying hanger at the top of the panel for supporting and pivotally suspending it from and mounting it for travel on a trackway.

10. An indicator of the character described comprising a supporting frame provided with a horizontal transverse trackway and an abutment surface arranged below and spaced from the trackway, a row of sign display panels arranged side by side and resting against the abutment surface and each provided at its upper end with a roller carrying hanger for detachable engagement with and travel along the trackway, each panel being provided with a pair of vertically disposed side pieces and horizontally arranged partitions spaced apart vertically and providing a vertical row of sign holders and sign display elements adapted to be detachably mounted in the holders, each having angularly related sign display faces any one of which may be exposed by selective positioning of the sign element in the holder.

11. In an indicator of the character described, a sign display panel comprising an elongated relatively narrow body formed by a pair of vertically arranged side pieces and horizontally arranged vertically spaced partitions forming a vertical series of fixedly connected holders each adapted to receive a removable sign element, and a roller carrying hanger at the top of the panel for suspending it from pivotally connecting it with and mounting it for travel on a supporting trackway.

12. An indicator of the character described comprising a supporting frame provided with a horizontal transverse trackway embodying a track rail and a flange extending upwardly therefrom in combination with an abutment surface arranged below and spaced from the trackway, a row of sign display panels arranged side by side and resting against the abutment surface and each provided at its upper end with a hanger bracket embodying an inverted U-shaped portion and a roller carried thereby for detachable engagement with a vertical row of cells each open at front and rear, and sign display blocks adapted to be detachably mounted in said cells, each having angularly related sign display faces any one of which may be exposed by selective positioning of a block in a cell.

13. In an indicator of the character described, a support carrying a trackway having a horizontal track portion and a guide and stop flange extending upwardly therefrom, and a sign display panel comprising an elongated relatively narrow body formed by a pair of vertically arranged side pieces and horizontally arranged vertically spaced partitions forming a vertical series of fixedly connected holders each adapted to receive a removable sign element, and a bracket at the top of the panel having an inverted U-shaped portion carrying a roller for supporting the panel from and mounting it for travel on the trackway.

References Cited in the file of this patent

UNITED STATES PATENTS

| | | |
|---|---|---|
| 287,837 | Loomis | Nov. 6, 1883 |
| 895,320 | Wilt | Aug. 4, 1908 |
| 1,472,928 | MacKenzie | Nov. 6, 1923 |
| 1,635,927 | Curtis | July 12, 1927 |
| 1,667,091 | Wolstenholme | Apr. 24, 1928 |
| 1,853,847 | Brumbaugh | Apr. 12, 1932 |
| 1,970,822 | Sommers | Aug. 21, 1934 |
| 2,291,703 | Fifield et al. | Aug. 4, 1942 |
| 2,481,709 | Adams | Sept. 13, 1949 |

FOREIGN PATENTS

| | | |
|---|---|---|
| 12,053 | Great Britain | June 3, 1908 |